Oct. 8, 1968     W. B. BURKETT ET AL     3,405,293

ELECTRICAL STARTER FOR GASOLINE ENGINES

Filed April 19, 1966     4 Sheets-Sheet 1

WILFORD B. BURKETT
ROBERT V. JACKSON
INVENTORS.

WHANN & McMANIGAL
Attorneys for Applicants.

Oct. 8, 1968 W. B. BURKETT ET AL 3,405,293
ELECTRICAL STARTER FOR GASOLINE ENGINES
Filed April 19, 1966 4 Sheets-Sheet 2

WILFORD B. BURKETT
ROBERT V. JACKSON
INVENTORS.
WHANN & McMANIGAL
Attorneys for Applicants

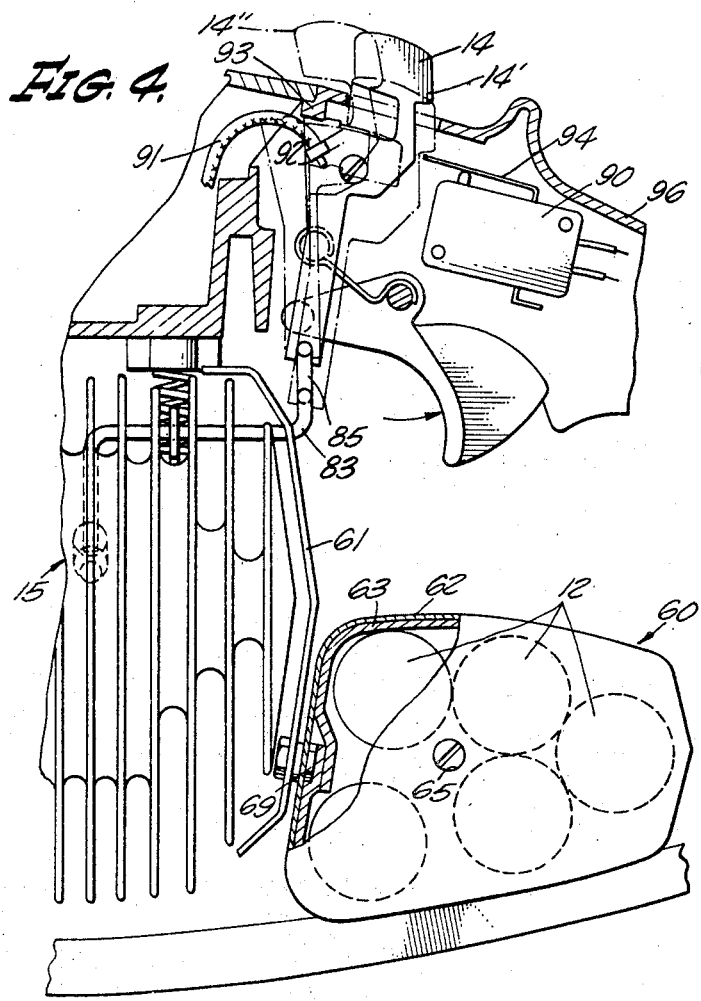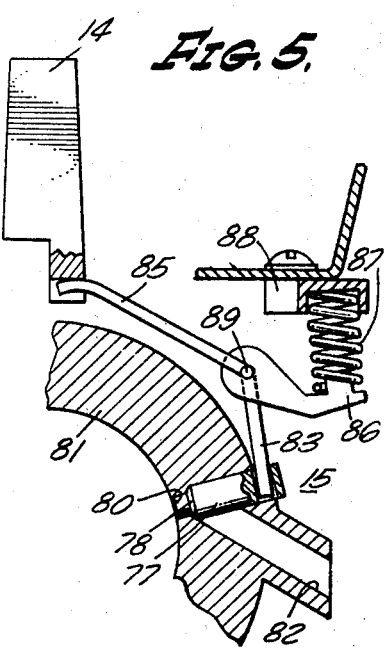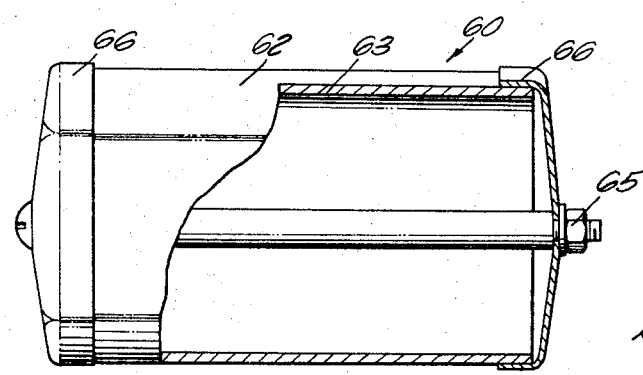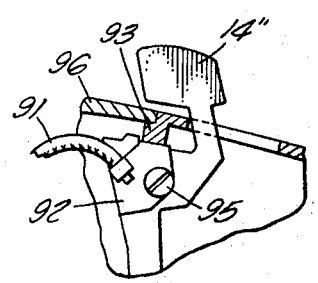

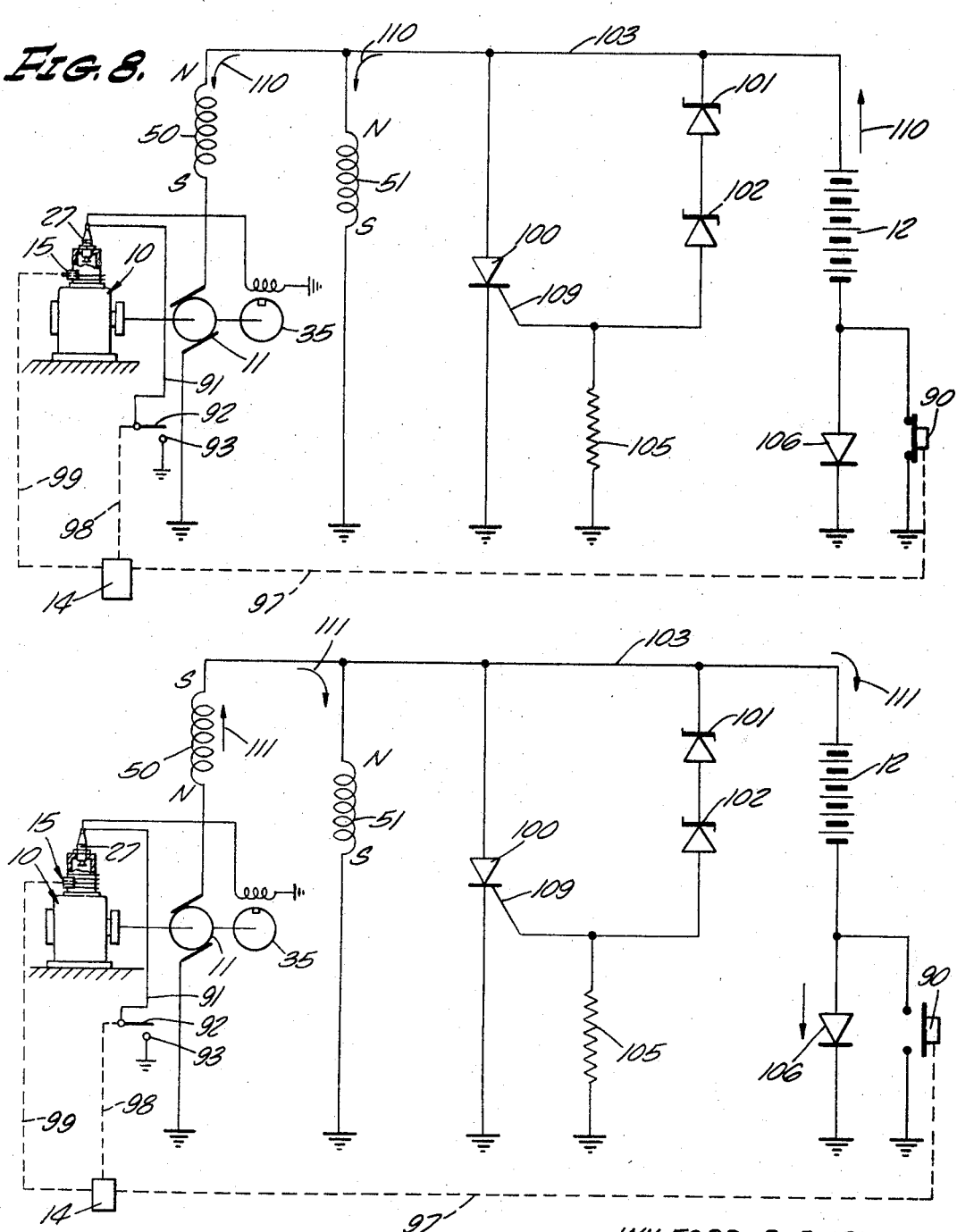

United States Patent Office 3,405,293
Patented Oct. 8, 1968

3,405,293
ELECTRICAL STARTER FOR GASOLINE ENGINES
Wilford B. Burkett, Pacific Palisades, and Robert V. Jackson, Los Angeles, Calif., assignors to McCulloch Corporation, Los Angeles, Calif., a corporation of Wisconsin
Filed Apr. 19, 1966, Ser. No. 543,583
6 Claims. (Cl. 310—74)

ABSTRACT OF THE DISCLOSURE

A lightweight electrical machine having a short axial length wherein the rotor is mounted to a flywheel in a spaced-apart relationship rather than to a shaft to provide space for the circulation of air to cool the machine when in operation. The machine further includes an extension of the flywheel around the stator housing and the cooperation of the extension of the flywheel with an annular recess in the stator housing to form a labyrinth seal.

---

This invention relates generally to an electrical system for starting gasoline engines and particularly relates to a direct-current motor and generator with associated mechanism energized by a secondary battery for starting a portable, internal combustion engine.

The present invention has particular utility in connection with small, light-weight, internal combustion engines of the single-cylinder two-cycle type such as are used for portable chain saws. However, it will be understood that the utility of the present invention is not confined to this particular type of internal combustion engine, although it will be described in connection therewith.

Gasoline-engine-driven portable chain saws enjoy great popularity and are used on a large scale for cutting down trees or branches of trees and for bucking down trees. Due to the very nature of operation of such chain saws they are not used continuously and, hence, must be frequently restarted. All presently known chain saws must be started by manually pulling a rope starter wound on a pulley. Although electrical starter systems and their convenience are well known, it has not been possible in the past to utilize them for portable chain saws and other tools due to the severe space and weight problem. Since the normal weight of even a single-cylinder, two-cycle gasoline engine with related equipment including a saw chain is already appreciable, the additional weight of the equipment required for an electric starter system must be limited to a very few pounds.

It is accordingly an object of the present invention to provide an electrical starter system particularly adapted for a light-weight, internal combustion engine which may be of the single-cylinder, two-cycle type.

Another object of the present invention is to provide an electrical starter system of the type referred to including a direct current (DC) motor and generator, a battery such as a seconday battery, for powering the motor-generator to start the gasoline engine, an electric circuit for controlling charging of the battery from the motor-generator, a decompression means for the cylinder of the engine to facilitate starting and reduce the power required to be furnished by the motor, and a unitary interlocking control button for controlling starting, normal operation and off position of the chain saw.

A further object of the present invention is to provide a motor-generator of the type referred to which requires little space, has a minimum of weight and will nevertheless withstand high centrifugal forces such as encountered during operation.

An auxiliary object of the invention is to provide a motor-generator having a very narrow width compared to its diameter to save both space and weight.

Still another object of the present invention is to provide a DC motor and generator in combination with an internal combustion engine having a decompression valve to reduce the torque required to be furnished by the motor to start the gasoline engine.

Yet another object of the invention is to provide a DC motor and generator having brushes disposed on a radial face of the generator for the purpose of cleaning the commutator segments by throwing off carbon residue by centrifugal force.

Still a further object of the present invention is to provide a DC motor and generator of the type described having compound field windings arranged in such a way that the windings are in aiding relationship when the device is operated as a motor, thus, to provide a high output torque while the windings are electrically arranged in bucking relationship when the device operates as a generator to reduce the output or battery charging current.

Yet an additional object of the invention is to provide a motor-generator of the character disclosed having field windings disposed in continuous sinusoidal fashion to facilitate winding of the coils and having an armature mounted in such a way as to facilitate air circulation, hence to promote cooling of the motor-generator.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 4 is a front view, with parts in section, illustrating particularly a three-position control button for controlling the operation of the electrical starter system and a housing for the secondary cells making up the battery;

FIG. 5 is a fragmentary sectional view illustrating the control button with a linkage to a modified decompression valve and spring tending to return the control button into its unactuated position;

FIG. 6 is a fragmentary sectional view similar to that of FIG. 4 and illustrating the control button and ignition switch in the unactuated position;

FIG. 7 is a side view of the battery housing partly in section; and

FIGS. 8 and 9 are schematic circuit diagrams illustrating diagrammatically the gasoline engine, generator, field windings, and an electric circuit for controlling the charging current of the battery, FIG. 8 illustrating the operation as a motor, while FIG. 9 depicts the operation as a generator.

Figure 1:
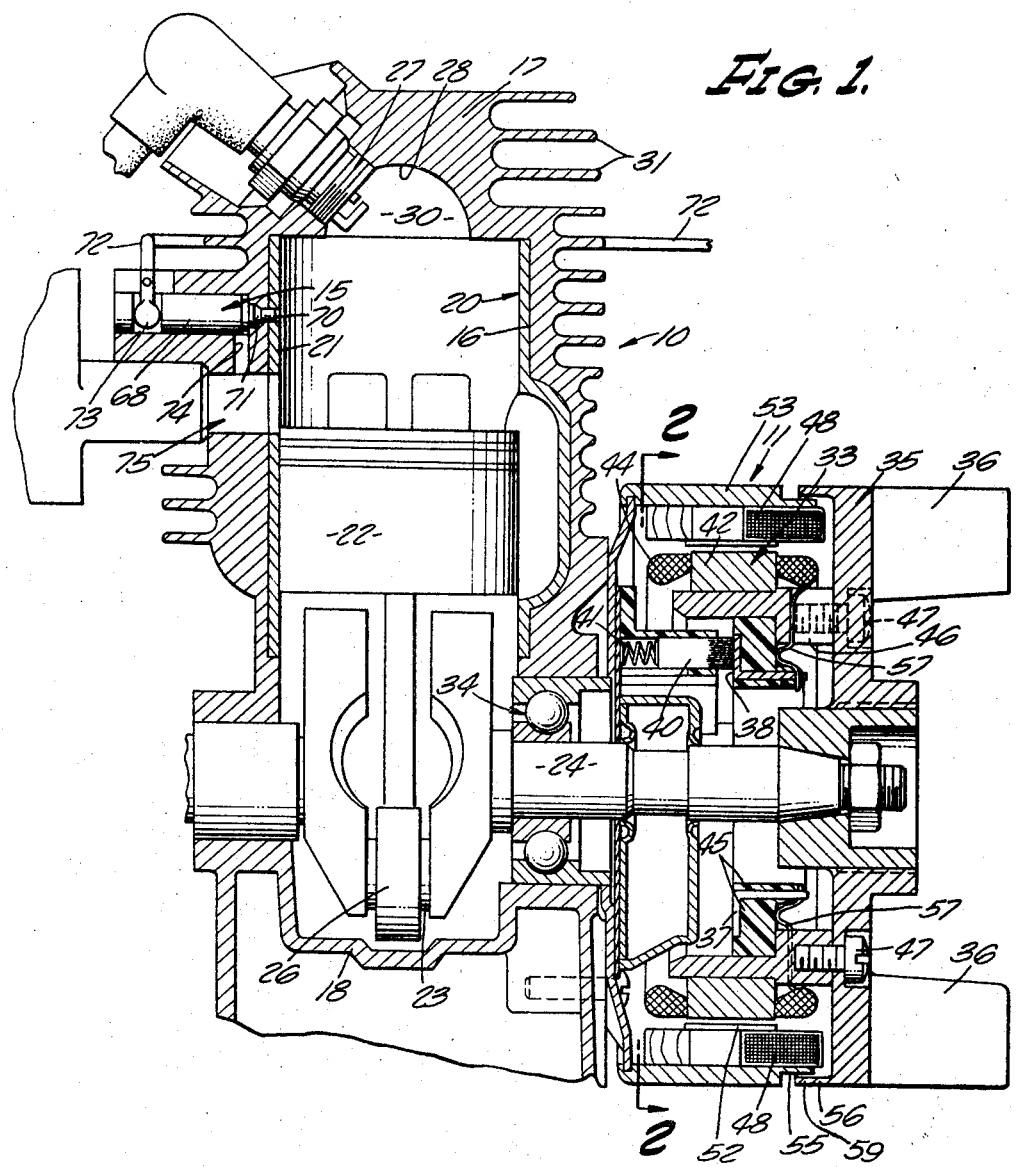
FIG. 1 is a side view, with parts in cross-section, of a gasoline engine including a decompression valve and DC generator and motor embodying the present invention.

Referring now to the drawings, there is illustrated the electrical starter system of the present invention. The starter system includes essentially an internal combustion engine 10, shown particularly in FIG. 1, a DC motor and generator 11 shown particularly in FIGS. 1 and 2, a secondary battery which may consist of a plurality of nickel-cadmium cells 12 shown in FIG. 4 and used for energizing the motor 11, a control button 14, having a mechanical interlock for controlling starting of the engine 10 and its normal operation, and for turning off the engine and motor, and an electronic circuit in FIGS. 8 and 9 for controlling the charging of the battery 12. In order to facilitate the starting of the engine 10 there may be provided a decompression means shown generally at 15 in FIG. 1 and shown in modified form in FIG. 5. This may consist, as will be more fully explained hereinafter, of a compression relief valve which has been disclosed and claimed in the copending application to Wilford B. Burkett, Ser. No. 512,860, filed on Dec. 10, 1965, entitled "Compression Relief Mechanism for Starting Two-Cycle Engines" and assigned to the same assignee as is the present application.

Thus, the gasoline engine 10 is started by operating the control button 14 which closes an electric connection between the battery 12 and the DC motor 11 to drive the engine. In order to facilitate starting of the engine, the compression created by the piston of the engine within the cylinder may be relieved by a suitable decompression valve. After the engine has been started, an electrical starter switch is opened again by the manually operated control button 14, and the battery is recharged from the motor-generator which operates as a generator driven by the engine. The battery charging current is then effectively disconnected when the battery voltage has reached a predetermined value. This is effected by the electrical battery charging circuit of FIGS. 8 and 9.

Having described very briefly the general operation of the electrical starter system of the present invention, the construction of the engine 10 will now be disclosed by reference to FIG. 1. The engine has been illustrated as an internal combustion engine having a single cylinder 16 and being of the two-cycle type. The engine includes an engine block 17 and a crank case 18 therefor. The engine block 17 is provided with a cylinder liner 21 defining a cylindrical space 20.

Within the cylindrical space 20 is reciprocably mounted a piston 22 connected to the crank 23 of a crank shaft 24 by a connecting rod 25, one end of which is pivotally connected to the piston 22, while its opposite end is provided with a bearing 26 which in turn is connected to the crank 23 of the crank shaft 24.

The engine is also provided with a spark plug 27 disposed in a semi-spherical recess 28 arranged adjacent to and communicating with the cylinder 16. The spark plug 27 serves the usual purpose of igniting the fuel mixture in the combustion chamber 30 of the cylinder 16. This may be effected by any conventional ignition system. It will also be understood that the construction of the internal combustion engine 10 as disclosed herein is entirely conventional. The engine block 17 may be provided with cooling fins 31 to promote cooling of the engine which may have to run at a very high speed, as will be apparent in view of the fact that it is a single cylinder, two-cycle engine.

The DC motor and generator 11 is preferably directly connected or keyed to the crank shaft 24 of the engine 10. As pointed out before, the generator 11 requires very little space and is of very low weight. In order to drive the generator 11, the crank shaft 24 extends toward the right as viewed in FIG. 1 and has mounted thereon the rotor or armature 33, for example, by a key. The crank shaft 24 is rotatably mounted in a bearing 34 disposed in the engine block 17. The rotatable armature 33 further is connected to a flywheel 35 being provided with fins 36. The fins 36 operate as a fan to cause circulation of the air, thereby to cool the engine 10.

Figure 2:
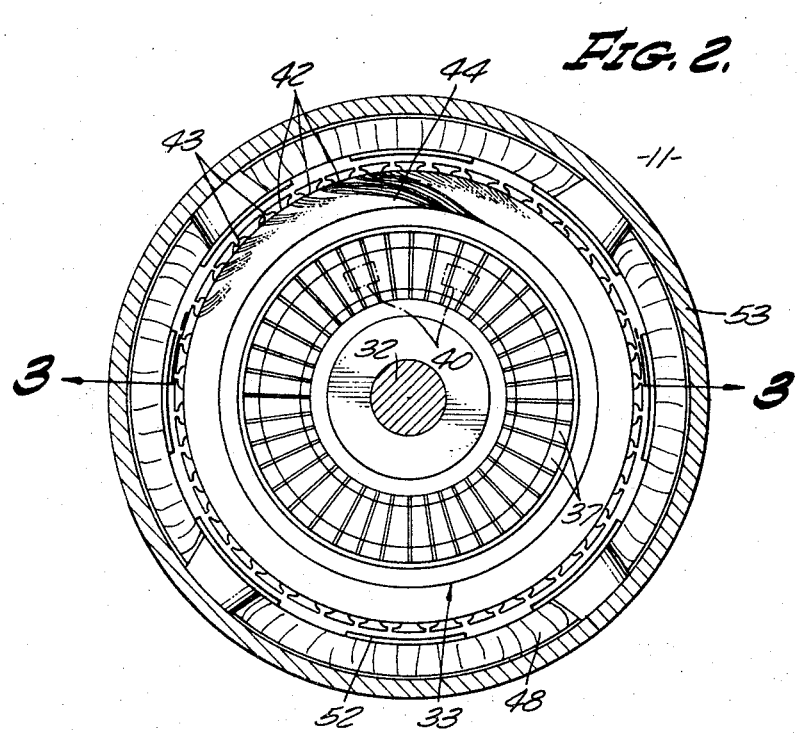
FIG. 2 is a sectional view taken on line 2—2 of FIG. 1, and illustrating the commutator segments of the rotor, armature windings and field windings of the motor-generator.

The rotatable armature 33 includes a plurality of commutator segments 37 having flat, radially extending surfaces 38 against which a pair of brushes 40 shown particularly in FIG. 2 are urged by springs 41. It will be noted that the two brushes 40 are disposed within an angle of about 45°. This is made possible because, as will be explained shortly, the number of field pole shoes is 8 so that the two brushes extend over more than one field pole shoe.

The armature 33 further includes a plurality of angularly spaced poles 42 which preferably are undercut as shown at 43 in FIG. 2 to provide space for the armature windings 44 and to minimize the danger of the armature windings 44 being forced outside of the poles 42 by the considerable centrifugal force developed by the rotating armature 33. The commutator segments 37 are cast or potted in a suitable insulating compound shown at 45 which further minimizes the danger of the armature exploding under the action of the centrifugal force.

It should be noted that the flat radially extending surfaces 38 of the commutator segments 37 provide for self-cleaning of the commutator. Any carbon residue from the brushes is thrown off by the centrifugal force when the rotor rotates at high speed.

The armature is provided with a plurality of angularly spaced mounting lugs 46 through which extend screws 47 to connect the flywheel with its fins 36 to the armature 33. Thus, the armature is spaced from the flywheel 35 to permit circulation of air about the entire rotor or armature, thereby to cool the motor-generator.

The flywheel 35 must, of course, be dynamically balanced, as is conventional, and may be provided with magnets and counter-balancing weights along its rim to provide a magneto for the ignition system. However, this feature is optional.

Figure 3:
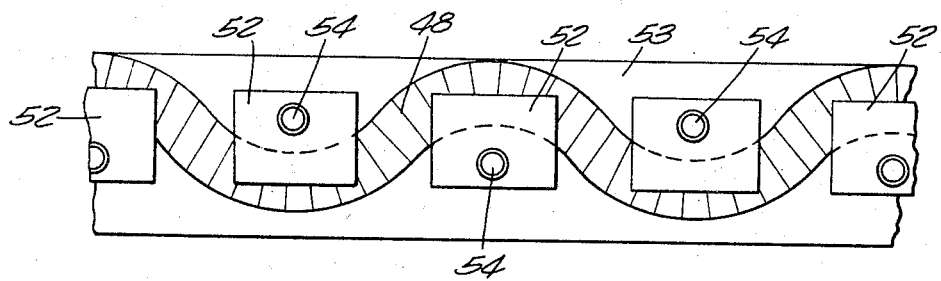
FIG. 3 is an elevational view taken essentially on line 3—3 of FIG. 2 and illustrating a portion of the field windings and pole shoes of the motor-generator laid out flat.

The field windings, of which there are two, are disposed as shown at 48, particularly in FIG. 3, in sinusoidal form. This facilitates the winding of the two field coils because it is easier to wind them continuously rather than as separate pairs of field windings. The electrical connection of the two field windings shown at 48 in FIGS. 1 to 3 is more clearly illustrated in FIGS. 8 and 9. Thus, the motor-generator 11 has a series field winding 50 and a shunt field winding 51. This, of course, provides a compound DC motor, which, as will be explained hereinafter, is differentially compounded.

The field windings generally shown at 48 cooperate with and are mechanically held together by eight field poles or pole shoes 52 which are secured to a fixed housing 53 secured in any suitable manner to the crankcase 18 or engine block 17. Thus, the field windings 48 may be held by the field poles or pole shoes 52 by means of retaining screws 54.

The fixed housing 53 for the field windings 48 is of cylindrical shape, as clearly shown in the drawings and is provided with an annular outer recess 55. This forms a seal with a cylindrical extension 56 of the flywheel 35 having a cooperating inner surface 59. This construction, as clearly shown in FIG. 1, provides a labyrinth seal to keep wood chips or saw dust out of the generator housing. At the same time the seal provides sufficient clearance to permit the flywheel and armature to rotate freely. Another feature of the generator of the invention are the jumper wires 57 interconnecting each of the armature windings to one of the commutator segments. It should be noted that each jumper wire 57 extends about the far side of each commutator segment and is soldered thereto.

The motor and generator 11 serves the purpose to start the engine 10 with the power derived from the batteries and thereafter recharges the batteries. It is designed to withstand high centrifugal force. It should be noted that the armature 33 which forms the rotor is of hubless design and is radially very thin. The weight has been reduced by providing just enough iron to carry the magnetic flux and just enough copper to carry the electric current. The motor may have a diameter of about 4.4" compared to a thickness of 1.4" which corresponds to a ratio of diameter to thickness of slightly over 3 to 1. This, of course, represents a savings of space. The motor has eight field poles which provides high torque even at low speeds. This is, of course, essential for starting the engine.

Having now described the engine and the motor, the manner of mounting the battery will now be described.

The battery used with the motor-generator 11 is a secondary battery and preferably consists of nickel-cadmium cells. There may be ten such cells, each being rated nominally at 1.25 volts. These cells may, for example, be disposed in a housing 60 shown particularly in FIGS. 4 and 7. Thus, the battery housing 60 may be secured to a shroud 61 enclosing the engine. As shown in the drawings, the battery housing 60 may have an outer, open-ended cover 62 within which is disposed an overlapping piece of insulating sheet material 63, the ends of which are secured to each other and to the engine shroud 61 by a suitable insulated bolt assembly 69. Another nut and bolt 65 secures the two end caps 66 to the main cover 62. Five cells are visible in FIG. 4 within the battery housing 60. Two of these cells are put end-to-end so that there is a total of ten secondary cells jointly forming the battery 12.

It should be noted that the battery 12 may also be used for other purposes, that is, other than energizing the electric motor 11. They may be used, for example, to drive a pump or chain saw sharpener. It should be noted that a current of 5 amps. may be taken from the generator when the engine is running at full speed. This requires only about 0.1 horsepower from the engine. The entire weight of the motor-generator 11 and the ten cells forming the battery 12 is between 3 and 3½ lbs.

Before describing the construction and operation of the control button 14, the purpose and construction of the decompression valve 15 will now be described.

As shown particularly in FIG. 1, there is provided a valve body 68 disposed in the engine block 17 and communicating with the cylinder lining 21 having a suitable aperture 70. As disclosed in the prior application of one of the applicant's previously referred to, the valve body 68 preferably is provided with a conical outer portion 71, which prevents clogging of the valve port and which provides cleaning of the port as the valve is closed. The valve may be actuated by a linkage 72 including a semi-spherical head 73 disposed in a suitable recess of the valve body 68.

When the valve is opened it will provide a path from the valve port 70 to a passage 74 which in turn communicates with the exhaust 75.

A slight modification of the decompression valve 15 is shown in FIG. 5 to which reference is now made. Here the valve body 77 again has a conical end portion 78 disposed in a valve port 80 in the wall of the cylinder 81. The port 80 communicates with a passage 82 which in turn is connected to the exhaust. The valve body 77 is operated by means of a rod 83 extending through a suitable aperture in the valve and is pivoted at 89 to a lever 85 which in turn is connected to the control button 14. Thus, when the control button 14 is depressed, the rod 83 is rotated in a counterclockwise direction and the valve body 77 opens. At the same time a lever 86 is moved upwardly against the force of a spring 87 having one end fixedly mounted at 88.

It is the purpose of the decompression valve 15 to relieve the pressure of the gas above the piston 22 when the piston moves upwardly. This, of course, will reduce the work required to start the engine. However, it should be emphasized that such a decompression valve may not always be necessary.

Referring now particularly to FIGS. 4 to 6, the construction and function of the control button 14 will now be explained. This control button 14 has the purpose to control the ignition system of the engine, the decompression valve 15 and the starter switch 90 shown in the circuit of FIGS. 8 and 9. To this end the control button 14 must have three different positions. One for starting the engine, the second for the normal operation of the engine and the third one for the off position. In the start position of the control button, the ignition switch to be presently described should be on so that the spark plug 27 may be supplied by the ignition system with electrical energy to produce sparks, the decompression valve 15 should be open and the starter switch 90 closed. After the engine has been started, the starter button must be released to permit it to move into its operating position. In that position the ignition is still on, the decompression valve is now closed which is, of course, necessary for the proper operation of the engine while the starter switch 90 is open. Finally, in the off position, the ignition switch is off as well as the starter switch, which is open, while the decompression valve remains closed.

Thus, as shown in FIG. 4, the control button 14 has an operating position 14 shown in full lines. It has a start position shown in dot and dash lines at 14' and it has an off position also shown in dot-dash lines at 14". Thus, in order to start the engine the control button 14 is moved first from position 14" to 14 and is then pressed down into position 14'. This will cause opening of the valve body 77 as previously described against the action of spring 87. At the same time, the switch 90 which is the starter switch is closed by pressing down its lever 94. The ignition system includes an insulated wire 91 electrically connected to the metallic bracket 92 secured to the control button 14 by a screw 95. Hence the wire 91 and bracket 92 are movable with the control button 14. The bracket 92 is adapted to contact electrically a metallic extension 93 of the metallic housing 96, thereby to ground the wire 91. This in turn disables the ignition system.

After the engine has been started, the control button is released from position 14' and is forced by the action of spring 87 to move upwards into position 14. In the operating position 14 of the control button, wire 91 and bracket 92 are still spaced from the portion 93 of the housing. Hence, in this position the ignition is still on while the valve 77 is allowed to close again. At the same time the starter switch 90 is opened.

In order to stop the engine, the control button is moved into position 14" which turns the ignition off. This is shown particularly in FIG. 6 where the wire 91 and bracket 92 are electrically connected with the metallic extension of the housing 96. This grounds the wire 91 and, hence, the ignition is turned off. At the same time the valve remains closed and the starter switch remains open.

It will thus be seen that there is a mechanical interlock which causes the starter switch 90 to close at the same time the decompression valve 15 is opened and vice versa. On the other hand, the ignition remains on while the engine is started and when the engine is running.

Reference is now made to the circuit shown in FIGS. 8 and 9 for controlling the charging of the battery 12 by the generator 11. The circuit of FIG. 8 illustrates the starting of the engine while that of FIG. 9 shows the operation when the battery is being charged.

In the circuit of FIGS. 8 and 9, the decompression valve 15, ignition switch 92, 93 and the control button 14 have been shown schematically. Therefore, in FIG. 8 the decompression valve 15 is shown in the open position while the ignition switch 92, 93 is also open to turn the ignition on. The starter switch 90 is closed. The dotted connection 97 schematically indicates that the control button 14 controls the starter switch 90. Similiarly, the dotted connection 98 shows how the ignition switch 92, 93 is controlled by the control button 14. It will be seen that when the ignition switch is closed, ground is connected to wire 91. Finally, the dotted connection 99 shows the control of the decompression valve 15 by the control button 14.

An electronic switch 100 which may, for example, be a silicon-controlled rectifier, is connected across the shunt winding 51 of the generator 11, one terminal of which may be grounded as shown as well as one terminal of the generator. A pair of Zener diodes 101 and 102 are connected between the lead 103 interconnecting the series winding 50 and the shunt winding 51 and the gate or control electrode 109 of the silicon-controlled rectifier 100. It will be apparent that one of the Zener diodes 101, 102 may be omitted. A resistor 105 may be connected between the control gate 109 and ground. The battery 12 is connected in series with the lead 103 and a diode 106 which is so poled as to prevent current flow from the battery 12 to the generator 11 unless the switch 90 is closed, the switch 90 being connected across the diode 106.

This battery charging circuit has been disclosed and claimed in the copending application to Burkett and Jackson, Ser. No. 530,129, entitled "Voltage Cut-off Circuits" and filed on Feb. 25, 1966. As explained therein, the two Zener diodes 101, 102 and the resistor 105 provide a voltage divider connected essentially across the battery 12. This voltage divider is so arranged that it will fire the silicon-controlled rectifier 100 by applying the appropriate voltage on its control gate 109 when the voltage across the battery 12 has reached a predetermined value. The reason for providing two Zener diodes 101 and 102 in series has been explained in the copending application of the applicants.

The diode 106 prevents current flow in the direction shown in FIG. 8 by the arrows 110, unless it is by-passed by the closed starter switch 90.

The operation of the electrical starter system of the present invention will now be explained. In order to start the engine, the control button 14 is moved from its inoperative position 14" back into position 14 and is then pushed down into position 14'. This, as explained before, will open the decompression valve 15. At the same time it will turn on the ignition 92, 93 and close the starter switch 90.

Closing of the starter switch 90 by-passes the diode 106 and permits current flow from battery 12 in the direction shown by arrows 110 through the shunt winding 51 to ground and through the series winding 50 and the motor 11. Accordingly, the two windings 50 and 51 are connected in series aiding relationship. Therefore, the magnetic poles on the windings 50 and 51 are so arranged that like poles, such, for example, as the north (N) poles are adjacent the lead 103. Accordingly, the DC generator and motor operates as a motor and drives the engine 10 to start it. Since the two field windings 50 and 51 are now arranged in series aiding relationship the motor-generator 11 is operated as a motor with a high output torque, thus, giving maximum mechanical output of shaft power to start the engine.

After the engine has been started, the control button 14 is released again and is urged from position 14' by spring 87 into its normal operating position 14.

The movement of the control button 14 into its normal operating position closes the decompression valve 15 again as previously explained. At the same time the starter switch 90 is opened again as shown in FIG. 9. This, of course, will prevent the flow of current from battery 12 in the direction shown by arrows 110 because this current flow is blocked by the diode 106. However, opening of the starter switch 90 still permits recharging of the battery 12 which will now be explained.

Since the engine 10 is now running, it drives the motor-generator 11 to operate as an electric DC generator. The output current flows in a direction shown by arrows 111. Thus, the total current flows through the series winding 50 and a portion flows through lead 103 into battery 12. Another portion of the output current flows through shunt winding 51 and, hence, to ground. Therefore, the two windings 50 and 51 are now arranged in a bucking relationship. As a result, unlike magnetic poles of the windings 50 and 51 are disposed adjacent the lead 103, for example, the south (S) pole of winding 50 and the north (N) pole of the winding 51.

Therefore, it will be apparent that the electrical output current of the generator 11 is now limited. This is a desirable result because it limits the current charging the battery 12. It has been found by tests that this is an efficient manner of recharging the secondary battery 12 which may consist of nickel-cadmium cells.

A normal starting cycle consists of three seconds cranking or starting the engine 10 and a nine second cycle recharging the battery 12. However, it has been found that the motor-generator 11 can be operated as an electric motor for as long as two to three minutes to crank the engine without damaging the secondary battery consisting of ten nickel-cadmium cells. Ten such cells have a nominal voltage of 13 volts and can be charged with a current of 8 amps. up to a voltage of about 15 volts.

The engine 10 is cranked by the motor 11 at around 700 r.p.m. (revolutions per minute). The engine starting speed is about 500 r.p.m. while the maximum engine speed is 12,000 r.p.m. On the other hand, the motor-generator 11 has been designed to withstand 23,000 r.p.m.

The amount of bucking that is provided when the circuit is operated as shown in FIG. 9 and hence the amount of output current may be controlled. To this end, the size of the shunt winding 51 may be increased or decreased.

As explained before, the entire chain saw may be stopped by putting the control button 14 into position 14". This will turn the ignition off by closing switch 92, 93 and, hence, stop the engine 10. At the same time the starter button 90 remains open and the decompression valve 15 remains closed.

It will be understood that the two Zener diodes 101 and 102 and the resistor 105 are so proportioned to trigger the silicon-controlled rectifier 100 when the voltage across the battery 12 has reached a predetermined value such, for example, as 15 volts. This in turn will short-circuit the shunt winding 51. This prevents the generation of an output current from the generator 11 so that charging of the battery 12 is effectively stopped. This, of course, prevents damage to the battery 12 because the battery charging circuit shown in FIG. 8 responds to the voltage across the battery 12 and will shut off the charging current once the battery voltage has reached a preset value. Thus, on the one hand, the battery charging circuit responds to the battery voltage, but on the other hand, the output current of the generator 11 is controlled by the proper proportioning of the field windings 50 and 51.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and we do not wish to be restricted to the specific form shown or uses mentioned except as defined in the accompanying claims, wherein various portions have been separated for clarity of reading and not for emphasis.

We claim:

1. A direct-current motor-generator comprising a rotatably disposed armature, said armature having a plurality of commutator segments, said segments having flat surfaces disposed in a plane arranged at right angles to the axis of rotation of said armature; a fixed housing of cylindrical shape having an outer annular recess; magnetic field pole shoes mounted on the inner annular surface of said housing; at least one fixed field winding on said field pole shoes; a plurality of brushes disposed on the flat faces of said commutator segments whereby said commutator segments are self-cleaning due to the centrifugal force removing particles; a rotatable element having a cylindrical extension forming a labyrinth seal with said outer recess of said fixed housing; and means for attaching said armature to said rotatable element.

2. A direct-current motor-generator comprising a rotatably disposed armature; said armature having a plurality of commutator segments, said segments having flat surfaces disposed in a plane arranged at right angles to the axis of rotation of said armature, at least one fixed field winding, magnetic field pole shoes associated with said field winding; a plurality of brushes disposed on the flat faces of said commutator segments, a plurality of angularly spaced external mounting lugs on one face of said armature projecting above said face and spaced to provide an air gap between the lugs, and a flywheel secured to said mounting lugs and spaced from said armature by the projection of said lugs above said face whereby air can circulate around said armature for cooling said armature.

3. A direct-current electrical machine comprising a stator including a means for producing a magnetic field; a rotor of short axial length positioned between two parallel planes which are perpendicular to the axis of rotation, said rotor having a core with magnetic poles attached, an armature winding on said poles and a plurality of commutator segments having flat surfaces disposed on said core in a plane at right angles to the axis of rotation of said rotor; means for coupling the machine to another device; a flywheel attached to said coupling means; said flywheel having a mounting surface perpendicular to the axis of rotation of said flywheel; and a plurality of means extending beyond the axial length of said rotor with air space therebetween for attaching said rotor to the mounting surface of said flywheel in a spaced-apart relationship.

4. A machine in accordance with claim 3 wherein said mounting means comprises angularly spaced lugs on one face of said core of said rotor, and means for attaching said flywheel to said lugs.

5. A machine in accordance with claim 3 wherein said stator has a fixed cylindrical housing with an outer annular recess at one end, and said flywheel has a cylindrical extension cooperating with said recess to form a labyrinth seal.

6. An electrical machine in accordance with claim 3 wherein said flywheel includes fins attached to the outer surface to form a fan to circulate air for cooling.

References Cited

UNITED STATES PATENTS

| | | |
|---|---|---|
| 1,511,492 | 10/1924 | Aspden. |
| 1,541,334 | 6/1925 | Dremel. |
| 1,915,982 | 6/1933 | Doman _____ 290—46 XR |
| 1,946,513 | 2/1934 | Webster et al. ____ 310—237 XR |
| 2,415,634 | 2/1947 | Hill _____ 310—237 |
| 2,541,235 | 2/1951 | Gayer _____ 310—237 XR |
| 2,874,309 | 2/1959 | Staak _____ 290—38 |
| 3,185,873 | 5/1965 | Rosenfeld _____ 310—74 XR |
| 3,328,617 | 6/1967 | Preece _____ 310—260 XR |

MILTON O. HIRSHFIELD, *Primary Examiner.*

D. F. DUGGAN, *Assistant Examiner.*